Oct. 21, 1924.
C. R. LAWLER ET AL
LOGGING TRUCK
Filed June 27, 1923
1,512,771
2 Sheets-Sheet 1
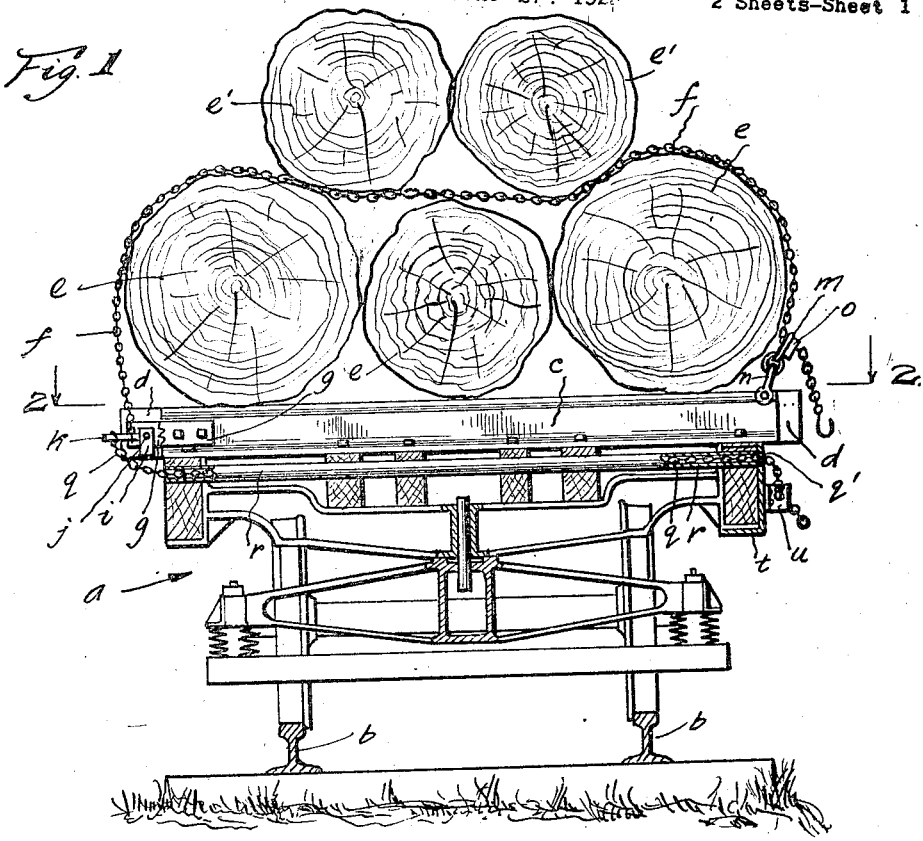
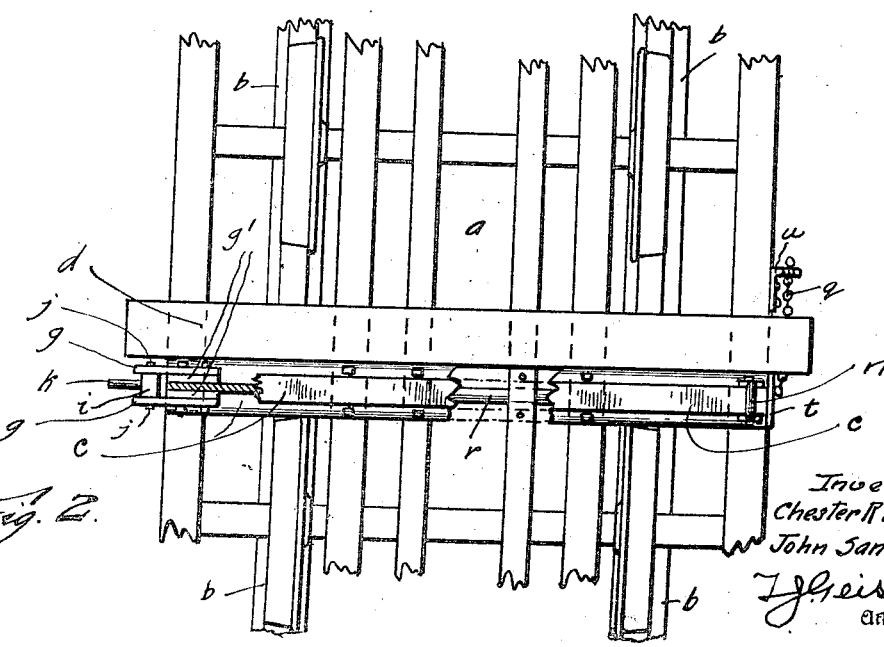
Inventor
Chester R Lawler
John Sannar

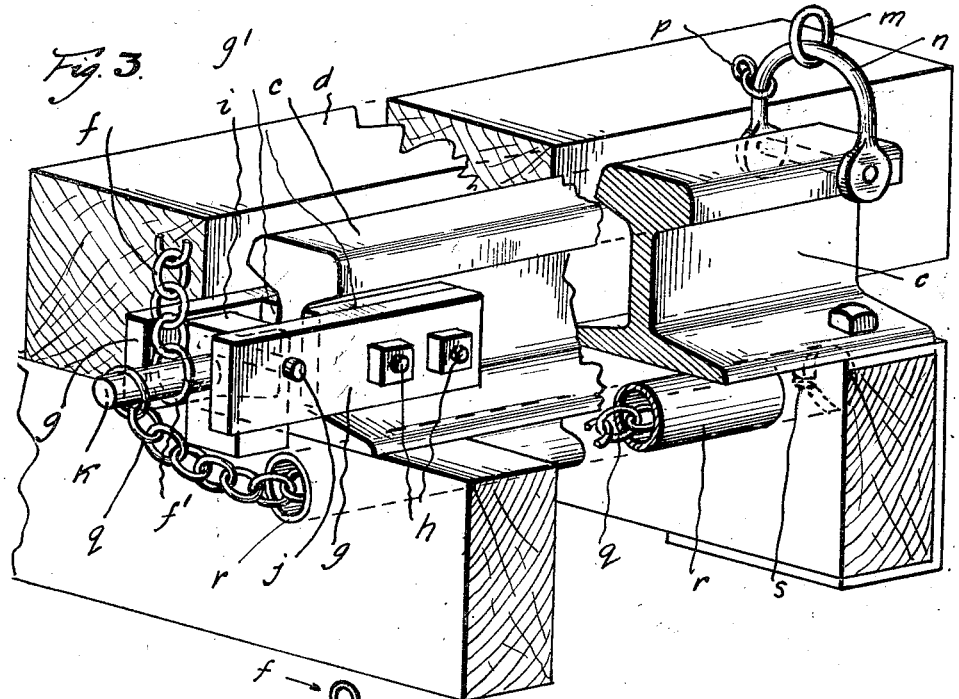
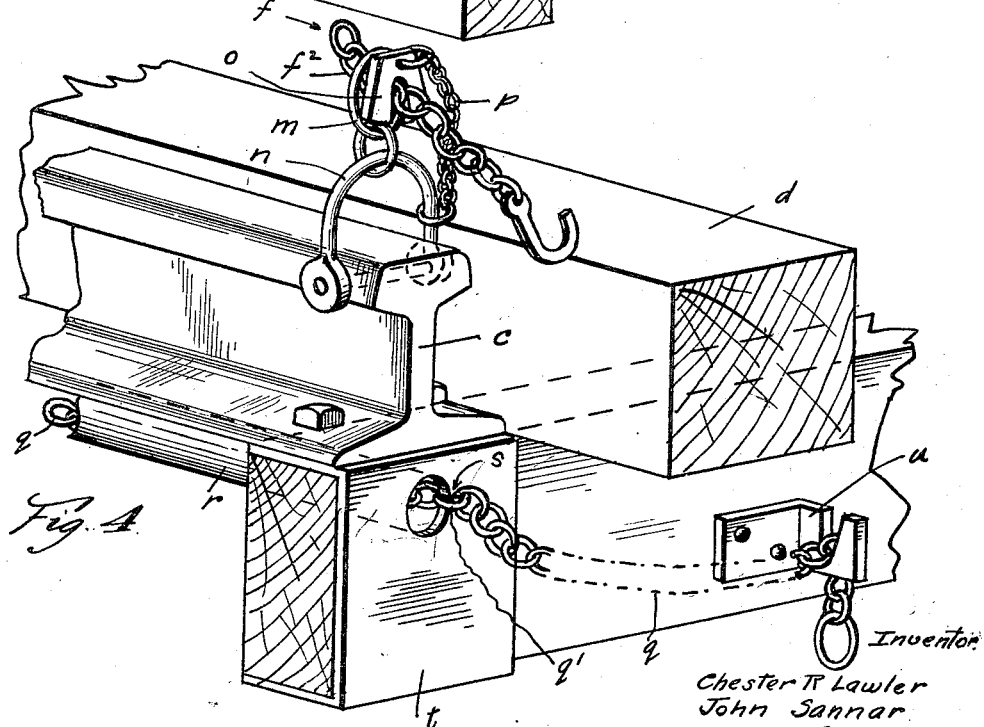

Patented Oct. 21, 1924.

1,512,771

UNITED STATES PATENT OFFICE.

CHESTER R. LAWLER AND JOHN SANNAR, OF ENTERPRISE, OREGON.

LOGGING TRUCK.

Application filed June 27, 1923. Serial No. 648,158.

*To all whom it may concern:*

Be it known that we, CHESTER R. LAWLER and JOHN SANNAR, citizens of the United States, and residents of Enterprise, county of Wallowa, State of Oregon, have invented a new and useful Improvement in Logging Trucks, of which the following is a specification.

Our invention relates to logging trucks and the like, and the object of our invention is to provide efficient means for securing the logs in place on the truck, and which means are so arranged that they may be released with safety to the person handling the truck.

A further object of our invention is to provide means of the character mentioned, which are simple and compact in construction, and may be easily applied to standard trucks and cars, and are adapted for withstanding severe service.

We attain our objects in combining with a logging truck, and the like, a log securing means comprising a pivoted, vertically movable pin on one side of the truck, a wrapper chain fastened at one end to the opposite side of truck and provided with an eye at its free end for securing on said pin; a trip chain, extending across the truck, provided with an eye at one end for securing on said pin, and means for securing the opposite end of the trip chain to the truck. The trip chain functions temporarily to hold the pin against being lifted by the strain of the wrapper chain, and the devices are so arranged that the means provided for securing said opposite end of the trip chain are located on that side of the truck opposite to that from which the logs will be discharged. Hence, the person handling the truck is out of danger during the releasing of the logs. All he does is to release said opposite end of the trip chain, so that the pin will be free to rotate and be lifted by the strain on the wrapper chain, which permits the link of the latter to slip off the pin, and thus releases the logs.

The details of construction of our invention are hereinafter fully described and illustrated in the accompanying drawings, in which:

Fig. 1 is a transverse section thru a logging truck and shows our invention applied thereto;

Fig. 2 is a section taken on the line 2—2 of Fig. 1 and is substantially a fragmentary plan view of the logging truck with parts broken away to show details of construction of our invention;

Fig. 3 is a fragmentary perspective of our invention showing both ends of the structure and having the middle portion broken away; and Fig. 4 is a fragmentary perspective looking in the operating side of our invention and shows how the devices are held in set position.

Our invention is adaptable for use on a standard logging truck or car. $a$ designates such car or truck. This is moved into position for unloading on a section of track $b$ which is usually, but not necessarily, on a slight angle, so that the unloading side of the car will be slightly lower than the operating side and thus tend to prevent the logs from inadvertently rolling off the operating side of the car. On the bed of the logging car we arrange a structural piece $c$ alongside of the bunk $d$. In the accompanying drawings we have shown this structural member as a section of rail but it can readily be seen this structural member might be any similar section which has the necessary strength to support the logs in loaded position. The logs $e$ are placed on the car longitudinally and usually rest on the bunks $d$. When the structural member is arranged so as to lie above the bunks $d$, the logs will rest thereon and it will take the resultant wear, and being of metal, withstands the wear for a greater length of time. A wrapper chain $f$ is placed over the logs to hold them in position on the cars. This chain is usually placed over the majority of the logs and one or two logs are placed on top of the same to hold the wrapper chain taut. We provide two flat members $g$, one on each side of the structural member which extend beyond the same and are fastened to it by bolts $h$. These plates are held in spaced relationship by the thickness of web of the structural member and of the fillers $g'$. A hinged block $i$ is pivotally mounted between these plates. This block $i$ is made with trunnions $j$ which pivotally support the block between the members $g$. A pin $k$ extends out from the block so as to be longitudinally alined with the structural member. The lower portion of the block $l$ is made of considerable mass so as to provide substantially a counterweight which holds the pin $k$ in its outward position. One end of the wrapper chain $f$, as $f'$ is placed over the pin $k$ and the other end $f^2$ is fastened thru a short section of chain $m$ on the shackle $n$ which is fastened to the opposite end of the structural member $c$ The chain $m$ is made with larger links than the wrapper chain $f$ and thus the chain readily passes thru these links and a V-shaped catch $o$ may be placed over one of the links and thus prevent it from pulling back out of position over the logs. This V-shaped catch is preferably made fast to some part of the structure so that it will not be misplaced. We have shown the catch member $o$ fastened to the shackle $n$ by means of a short section of chain $p$. The pin $k$ is held in its extended position by means of a trip chain $q$ which is arranged over the pin outside of the wrapper chain $f$. The pin $k$ is on the unloading side of the logging car and the trip chain is thus passed under the structural member to the opposite or operating side of the truck This is preferably passed thru a guiding tube $r$ so that it will not be caught and thus prevent it from operating properly. The trip chain is held in position by placing one of its links as $q'$ in a slot $s$ on the operating side of the truck. We have provided a metal cap $t$ thru which the end of the guiding tube $r$ passes on the operating side. The slot $s$ is made in the cap $t$ which is made of substantial thickness and thus the slot is not disformed due to severe usage. The free end of the trip chain is held in a V-shaped bracket $u$ which is fastened to the side of the car. The free end of the chain thus can not sway as the car is being moved to the unloading track, which would pull the trip chain out of the slot $s$.

The operation of our device is as follows: The logs are placed on the car and the wrapper chain is placed over the majority of them and one end of the chain is placed over the pin $k$ and the chain is then made taut and the catch $o$ is placed so as to hold the chain in taut position. A few other logs as $e'$ are placed on the top of the chain so as to hold the chain taut while the logs are being transported. Previously the trip chain $q$ has been made fast by placing it in the slot $s$ and its free end in the bracket $u$. When it is desired to drop the logs the trip chain is removed from the bracket $u$ and the chain may be removed from the slot $s$ by jerking the same therefrom. This action permits the block $i$ to rotate in a clockwise direction as viewed in Fig. 1 and thus permits the wrapper chain to fly upwards. The tracks for the car being arranged at an angle cause the logs to fall over the removing side. The chain, when being released from the pin $k$, is prevented from flying entirely over the logs and striking the operator because the logs $e'$ are on top of the chain.

We claim:

1. The combination with a logging truck, of log securing means comprising a pivoted, vertically movable, pin on one side of the truck, a wrapper chain fastened at one end to the opposite side of the truck, and provided with an eye at its free end for securing on said pin, a trip chain extending across the truck, being provided with an eye at one end for securing on said pin, and means for securing the opposite end of the trip chain to the truck thereby temporarily to hold the pin against being lifted by the strain of the wrapper chain.

2. The combination with a logging truck, of log securing means comprising a pivoted, vertically movable, pin on one side of the truck, a wrapper chain fastened at one end to the opposite side of the truck, and provided with an eye at its free end for securing on said pin, a guideway extending across the truck, a trip chain extending thru said guideway across the truck, being provided with an eye at one end for securing on said pin, and means for securing the opposite end of the trip chain to the truck, thereby temporarily to hold the pin against being lifted by the strain of the wrapper chain.

3. In a logging truck, a transverse load carrying member, a projection provided on one end of the load carrying member, a pin pivoted for vertical movement in said projection, a wrapper-chain fastened at one end of the opposite side of the truck, and provided with an eye at its free end for securing such end on said pin, a tubular conduit extending across the truck under said load carrying member, a trip chain extending thru said conduit across the truck, the trip chain being provided with an eye at one end for securing such end on said pin, and means for securing the opposite end of the trip chain, thereby temporarily to hold the pin against being lifted by the strain of the wrapper chain.

4. In a logging truck, a transverse load carrying member, a bifurcate projection provided on one end of the load carrying member, a pin pivoted for vertical movement in said projection, a wrapper-chain fastened at one end of the opposite side of the truck, and provided with an eye at its free end for securing such end on said pin, a tubular conduit extending across the truck under said load carrying member, a trip chain extending thru said conduit across the truck, the trip chain being provided with an eye at one end for securing such end on said pin, and means for securing the opposite end of the trip chain, thereby temporarily to hold the pin against being lifted by the strain of the wrapper chain.

CHESTER R. LAWLER.
JOHN SANNAR.